United States Patent
Horstmann et al.

(10) Patent No.: US 11,832,762 B2
(45) Date of Patent: Dec. 5, 2023

(54) METHOD FOR OPERATING A COOKING OVEN

(71) Applicant: ELECTROLUX APPLIANCES AKTIEBOLAG, Stockholm (SE)

(72) Inventors: Reiner Horstmann, Rothenburg ob der Tauber (DE); Jörg Schmidt, Rothenburg ob der Tauber (DE); Christoph Luckhardt, Rothenburg ob der Tauber (DE); Karina Steinwachs, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 17/764,688

(22) PCT Filed: Sep. 28, 2020

(86) PCT No.: PCT/EP2020/077101
§ 371 (c)(1),
(2) Date: Mar. 29, 2022

(87) PCT Pub. No.: WO2021/069248
PCT Pub. Date: Apr. 15, 2021

(65) Prior Publication Data
US 2022/0322711 A1    Oct. 13, 2022

(30) Foreign Application Priority Data
Oct. 10, 2019   (EP) .................................... 19202599

(51) Int. Cl.
*A23L 5/10*    (2016.01)
*A47J 37/06*   (2006.01)
*F24C 15/32*   (2006.01)

(52) U.S. Cl.
CPC ............. *A47J 37/0641* (2013.01); *A23L 5/17* (2016.08); *F24C 15/322* (2013.01); *A23V 2002/00* (2013.01)

(58) Field of Classification Search
CPC ..... A23L 5/17; A47J 37/0641; A47J 37/0754; F24C 15/322; F24C 15/32–15/327; A21B 1/26; A21D 8/06
See application file for complete search history.

(56) References Cited

U.S. PATENT DOCUMENTS 3,984,578 A * 10/1976 Rohrl .................... F24C 15/325
                                                            426/523
5,066,851 A * 11/1991 Darvin .................... F24C 15/16
                                                            219/400

(Continued)

FOREIGN PATENT DOCUMENTS

| CN | 109171484 | 1/2019 |
| EP | 2704526   | 3/2014 |
| EP | 2993409   | 3/2016 |

OTHER PUBLICATIONS

International Search Report and Written Opinion for PCT/EP2020/077101 dated Dec. 11, 2020, 7 pages.

*Primary Examiner* — Drew E Becker
(74) *Attorney, Agent, or Firm* — Pearne & Gordon LLP

(57) ABSTRACT

A control method for operating a cooking oven in a deep-frying program which is configured for a predetermined set temperature is disclosed, wherein the cooking oven has an oven cavity, a tray arranged within the oven cavity, a bottom heating element for heating the bottom of the cavity, a fan located at the rear wall of the cavity, and a ring heating element surrounding the fan. The method comprises the following stages: (a) a heat-up phase in which the ring heating element is continuously operated and the bottom heating element is intermittently operated, the heat-up phase (Continued)

being conducted until reaching a temperature of the oven cavity which corresponds to the set temperature plus a predetermined first hysteresis; (b) a subsequent holding phase in which the bottom heating element and the ring heating element are non-operative; and (c) a frying phase conducted upon reaching a temperature within the oven cavity which corresponds to the set temperature minus a predetermined second hysteresis, the frying phase comprising continuously or intermittently operating the ring heating element, and intermittently operating the bottom heating element so as to raise the temperature within the oven cavity to a temperature which corresponds to the set temperature plus a predetermined third hysteresis.

15 Claims, 2 Drawing Sheets

(56) References Cited

U.S. PATENT DOCUMENTS

| | | | | |
|---|---|---|---|---|
| 6,114,663 | A * | 9/2000 | Stockley | F24C 7/087 219/398 |
| 6,727,478 | B2 * | 4/2004 | Rael | H05B 6/6476 126/337 R |
| 8,049,142 | B2 * | 11/2011 | Blackson | F24C 7/087 219/486 |
| 8,097,833 | B2 * | 1/2012 | Bonuso | F24C 15/325 219/400 |
| 9,119,231 | B2 * | 8/2015 | Johnson | H05B 1/0263 |
| 10,561,277 | B1 * | 2/2020 | Swayne | A47J 37/0641 |
| 11,382,455 | B2 * | 7/2022 | Swayne | A47J 37/0641 |
| 2004/0035845 | A1 * | 2/2004 | Moon | F24C 7/10 219/400 |
| 2005/0241492 | A1 | 11/2005 | Kooyker et al. | |
| 2006/0289436 | A1 * | 12/2006 | Carbone | F24C 15/325 219/400 |
| 2007/0246452 | A1 * | 10/2007 | Blackson | F24C 7/087 219/400 |
| 2009/0250451 | A1 * | 10/2009 | Blackson | F24C 15/322 219/400 |
| 2013/0008426 | A1 * | 1/2013 | Newsom | F24C 15/325 126/21 A |
| 2016/0040892 | A1 * | 2/2016 | Wiseman | F24C 7/081 219/412 |
| 2017/0079090 | A1 | 3/2017 | De'Longhi | |
| 2017/0118798 | A1 * | 4/2017 | Johnson | H05B 1/0263 |
| 2017/0332676 | A1 * | 11/2017 | Minvielle | G05D 23/1904 |
| 2017/0343221 | A1 * | 11/2017 | Swayne | F24C 15/327 |
| 2019/0327795 | A1 * | 10/2019 | Hannah | F24C 7/088 |
| 2020/0053842 | A1 * | 2/2020 | Jeon | H05B 6/6473 |

* cited by examiner

METHOD FOR OPERATING A COOKING OVEN

The present invention relates to a method for operating a cooking oven, and in particular to a method for operating a cooking oven in a deep-frying program which is configured for a predetermined set temperature, wherein the cooking oven has an oven cavity, a tray arranged within the oven cavity, a bottom heating element for heating the bottom of the cavity, a fan located at the rear wall of the cavity, and a ring heating element surrounding the fan.

BACKGROUND OF THE INVENTION

The present invention thus is directed to a control method for operating a convection oven in a deep-frying program, which program aims at emulating deep frying of frozen convenience food in a substantially fat free manner, i.e. without submerging the food articles in hot fat, such as oil, but wherein a similar cooking result is to be attained as in standard deep frying.

In EP 2704526 there is disclosed a microwave oven which in addition to a microwave unit comprises a grill element and a convection heating element. The oven can be operated in a fry-cooking mode in which the food not only is heated by microwaves but further is heated by the grill and/or the convection heating element so as to both heat the core of the food articles and at the same time fry the surface of the food articles.

While EP 2704526 is restricted to ovens using a microwave unit to provide heat to the food articles, so that the control schemes suggested therein seem not to be directly transferable to other oven types, such as convections ovens, the fry-cooking mode suggested in this document further is considered to be disadvantageous because the microwave heating leads to an uneven water evaporation particularly in the first phase of the cooking process. That is, especially when the food articles being processed have a small cross-sectional area, such as in thin French fries, the microwaves penetrate the food articles completely, which results in the inside of the food articles drying out before the outer surface of the food articles has reached a sufficient degree of browning.

Attempting to simulate deep-frying in a conventional convection oven by heating the food articles with a grill element that is provided at the top of the oven cavity is problematic because it leads to uneven browning. Thus, given that more heat is transferred to the top side of the food articles, the top side browns much faster than the bottom, so that in order to achieve uniform browning the food articles need to be turned during the cooking process.

In view of the above disadvantages of the prior art methods, it is an object of the present invention to provide for a control method for operating a convection cooking oven in a deep-frying program which allows achieving better cooking results than known methods.

The present method is configured to be applied in a cooking oven which has an oven cavity, a tray arranged within the oven cavity, a bottom heating element for heating the bottom of the cavity, a fan located at the rear wall of the cavity, and a ring heating element surrounding the fan. The present method thus is configured for convection ovens or for cooking ovens having a convection heating function, such as so-called combined cooking ovens that can be heated not only by convective heating but additionally by at least one further heating methods, such as radiant heating, induction heating, steam heating and microwave heating.

The present method for operating a cooking oven in a deep-frying program comprises several stages including a heat-up phase, a subsequent holding phase and a frying phase.

In the heat-up phase the ring heating element is continuously operated and the bottom heating element is intermittently operated. That is, whereas the ring heating element is continuously operated, the bottom heating element is operated in a cycling manner in which the bottom heating element is turned on and off or is operated at a repeatedly changing power level. In this manner a rapid heating of the food articles to be processed is achieved, wherein however the heat transfer from the bottom is limited so as to achieve a uniform browning on all sides of the food article without having to turn the food articles during heating. In the heating scheme employed in the present method, the heat-up phase provides for faster heating of the food items as compared to other standard cooking programs.

The heat-up phase is conducted until a temperature of the oven cavity is reached which corresponds to the set temperature plus a predetermined first hysteresis. Such overshoot in terms of the set temperature provides for a faster heat transfer on the outside of the food which results in a faster water evaporation on the surface thus giving a crispier texture.

In the holding phase which follows the heat-up phase, the bottom heating element and the ring heating element both are non-operative. During the holding phase the heat energy that has been imparted onto the surface of the food articles is allowed to penetrate into the food articles so as to propagate towards the center of the food articles. The holding phase is conducted until a temperature within the oven cavity is reached which corresponds to the set temperature minus a predetermined second hysteresis.

Upon reaching such latter temperature, a frying phase is initiated during which the ring heating element is either continuously or intermittently operated, and the bottom heating element is intermittently operated so as to raise the temperature within the oven cavity to a temperature which corresponds to the set temperature plus a predetermined third hysteresis. During the frying phase the oven temperature thus can be raised in steps to the desired set temperature plus a set third hysteresis.

The frying phase may be terminated either upon having been conducted for a certain period of time, upon reaching a predetermined overall cooking time, or upon reaching a certain degree of browning, either manually by the user or automatically under the control of the oven controller.

The present method which has been tested with success for a wide variety of different convenience food products (such as French fries, potato pockets, fish fingers, breaded fish, chicken nuggets, spring rolls, wedges, pre-baked rolls, etc.), is advantageous over existing solutions in that it allows achieving a good frying result that is comparable to conventional deep frying methods, which however can be conducted in a fat-free, slim-fry or lean manner without having to provide for a pool of frying fat for submerging the food articles, and without the necessity of the user having to repeatedly turn the food articles so as to achieve uniform browning.

Preferably, the fan which is located at the rear wall of the cavity is operative during all stages, so as to distribute air throughout the oven cavity and feed air that is heated by the ring element surrounding the fan towards the tray that supports the food items to be processed.

During the heat-up phase and/or during the frying phase the bottom heating element preferably is intermittently operated so as to be operative during 50% to 70% of the respective phase.

The intermittent operation of the bottom heating element during the heat-up phase, and similarly of the bottom heating element and optionally also of the ring heating element during the frying phase, may comprise periodically switching the respective heating element to be alternatingly operative at a first and a second power level, or to be periodically switched on and off. Thus, for example in an oven that comprises a ring element with a power intake of 2.3 kW and a bottom heating element with a power intake of 1.0 kW, by continuously operating during the heat up phase the ring heating element and intermittently operating the bottom heating element by periodically switching on and off the bottom heating element so as to be operative during 50% to 70% of the heat-up phase, the oven thus is operated with an overall power intake that cycles between 2.3 and 3.3 kW, wherein the overall averaged power intake of the oven during the heat-up phase is limited to a value below 3 kW.

The predetermined first hysteresis, i.e. the overshoot in temperature above the set temperature, to which the oven cavity is heated during the heat-up phase, may correspond to 5% to 15%, preferably to about 10%, of the set temperature. That is, while a set temperature in the range of from 180° C. to 220° C. is preferred, when conducting the method with a set temperature of for example 200° C., the first hysteresis preferably has a value of from 10° C. to 30° C., and preferably is about 20° C.

That is, while in conventional deep frying methods a temperature of about 170-180° C. is considered optimal, the afore-mentioned set temperatures take into account that the present method does not use an oil bath for submerging the articles to be fried, but instead uses a heated air stream which has a lower heat transfer as compared to an oil-bath.

While in preferred embodiments the ring heating element has a power intake of from 1.8 to 2.5 kW, preferably of from 2.0 to 2.4, such as for example about 2.3 kW, the bottom heating element preferably has a power intake of from 0.8 kW to 1.5 kW, wherein a preferred power intake for the bottom heating element is about 1 kW.

In preferred embodiments of the present invention, the ring heating element is operated during the heat-up phase at a power intake that corresponds to 180% to 250% of the power intake of the bottom heating element. By providing a mayor portion of the heat via the ring heating element, the heat transfer from the bottom is limited so as to achieve a uniform browning on all sides of the food article without having to turn the food articles during heating.

In preferred embodiments of the method suggested herein, the predetermined second hysteresis, i.e. the differential temperature value by which the temperature within the oven cavity may drop during the holding phase, and the reaching of which triggers the start of the frying phase, preferably is in the range of from 5 to 20K and preferably is about 10K.

The predetermined third hysteresis, i.e. the overshoot in temperature to which the oven cavity is heated during the frying phase preferably is in the range of 5 to 20K and most preferred is about 10K.

In order to achieve an optimal frying effect, the ring heating element and the bottom heating element both are operated during the frying phase at maximum power intake. As was explained above, given that during the frying phase the bottom heating element is intermittently operated, such as to be operative during 50% to 70% of the frying phase, the total power intake for the frying phase can be kept below 3 kW so as to provide for an ample safety margin for operating the cooking oven in private homes having only a small number of separately fused power circuits and in which hence the maximum power intake of the individual device should be limited.

While heating elements may be employed which are configured to be operated at varying power levels, given that in the individual steps of the present method the ring heating element either is continuously operated, or is not operative at all, the construction of the cooking oven can be simplified by employing a ring heating element that is configured for a constant power intake.

In case that larger food items are to be processed which require a longer preparation time to be fully cooked, the method may comprise an additional step following the frying phase in which only the ring heating element is operated while the bottom heating element is turned off. While such additional heating step serves to provide heat for properly cooking the interior of larger food items, wherein more time is required for heat to reach the interior of the food items, in such additional step only the ring heating element is operated so as to avoid overheating of the bottom side of the food items.

In the additional step as it may be applied when larger food items are to be processed, the temperature of the oven cavity can be lowered to a temperature in the range of from 120° C. to 170° C., preferably of from 130° C. to 160° C. by correspondingly limiting the heat supply provided by the ring heating element, so as allow sufficient time to cook also the interior of the larger food items, but at the same time cause only little additional browning.

In preferred embodiments, the method of the present invention is conducted using a tray that has a discontinuous surface for the placement of food articles, such as a plurality of apertures or perforations that are distributed across the surface of the tray where food articles can be placed.

To provide for homogenous heating of the food articles, the perforated tray preferably is arranged within the cooking cavity so as to be located centered with respect to the ring element and the fan, i.e. which is most ovens will be at a center level of the cavity.

In order to avoid that the cavity floor is soiled during use of a perforated tray, such as by the dripping of fatty components of the food items which upon heating are released from the food items, the perforated tray preferably is used together with a dripping pan which is inserted into the oven cavity at the lowest level, so as not to interfere with the supply of cooking heat.

An example of a particularly preferred perforated tray that can be used to advantage in the method suggested herein is disclosed in EP 3 113 576 B1.

Particularly good cooking results can be achieved when a tray with a discontinuous surface is used in which the discontinuous surface for the placement of food articles has a plurality of apertures which comprise at least 45% of the surface.

As was pointed to above, the present method provides for a control method for operating a cooking oven in a deep-frying program, which allows deep-frying of food articles in a "slim-fry" mode wherein the frying is not performed in a pool of frying fat in which the food articles are submerged, but wherein the frying is effected by placing the food items to be processed on a cooking tray that is placed within the oven cavity and then operating the heating means of the cooking oven in a certain manner.

In comparison to conventional slim-fry or air-fry methods, such as were suggested in above acknowledged EP 2 704 526, the present method achieves a higher heat transfer in the first phase of the method also without the use of microwaves. With the oven cavity being heated during the heat-up phase to a temperature that is higher than the set temperature, the heat-up phase provides for a faster heat transfer on the outside of the food which serves to increase the water evaporation on the surface of the food items which allows achieving a crispy texture at the surface of the food items being processed.

With the heat provided from the bottom heating element being limited in each of the individual phases of the present method, either by intermittently operating the bottom heating element, or by completely turning off the bottom heating element, the present method effectively avoids overheating the bottom side of the food items and hence does not require the food items to be manually turned during the cooking process. Hence, the present control method allows conducting the food preparation process in a completely automated manner wherein no user intervention is required. Hence, the deep-frying function can be provided as a pre-programmed control scheme that can be selected by the user simply by selecting a "deep-fry" function, and optionally additionally selecting the kind of food to be cooked, such as French fries, potato wedges, potato croquettes, loaded potato sticks or balls, fish fingers, breaded fish, fish and chips, chicken nuggets, breaded chicken, spring rolls, pre-baked rolls, etc., so as to adapt the operating parameters of the cooking oven to further improve the cooking result.

BRIEF DESCRIPTION OF THE DRAWINGS

The present invention will be described in further detail with reference to the drawings from which further features, embodiments and advantages may be taken, and in which.

DETAILED DESCRIPTION OF PREFERRED EMBODIMENTS

Figure 1:
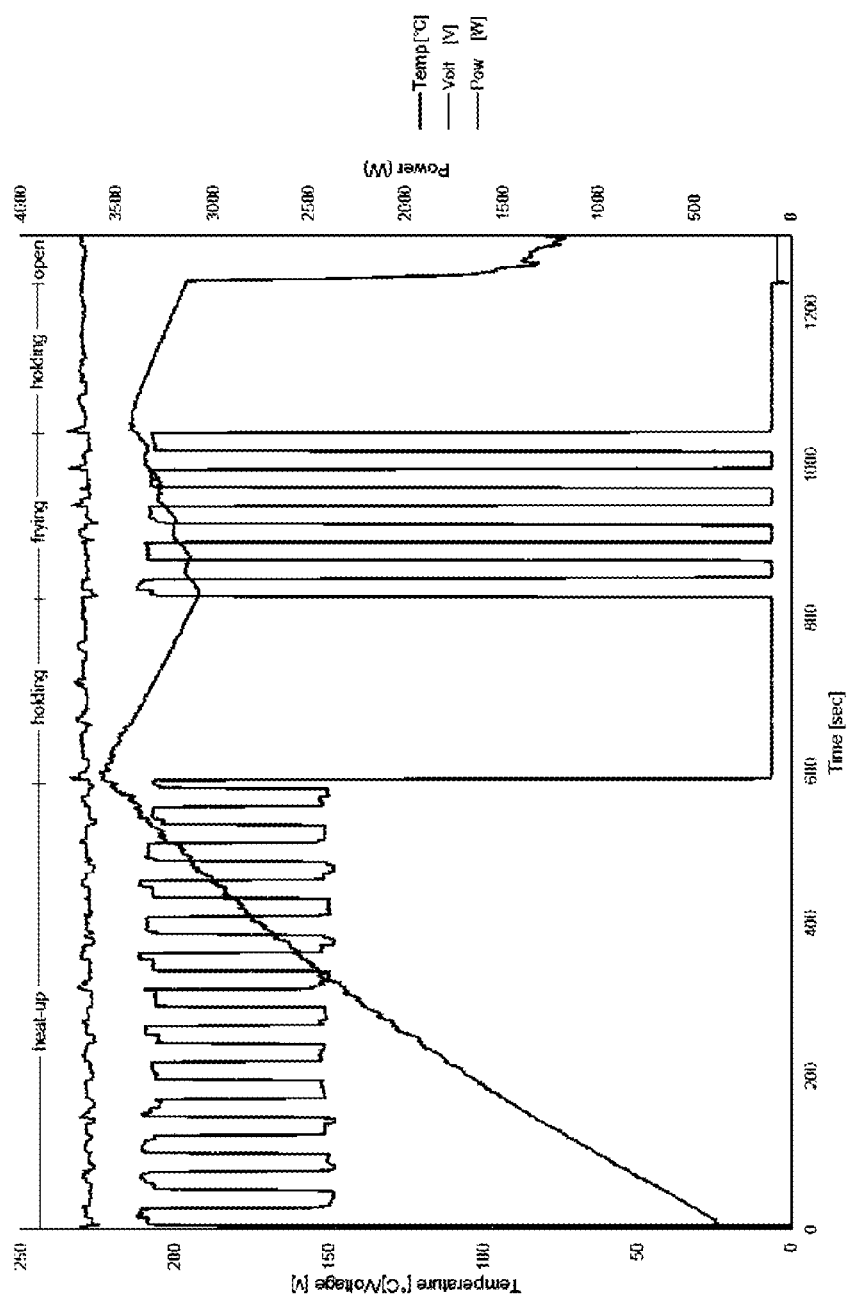
FIG. 1 is a diagram of temperature, voltage and overall power consumption of a cooking oven which is operated in accordance with the method suggested herein.

As illustrated in the operational diagram of a cooking oven operated in accordance with the method suggested herein, as it is shown in FIG. 1, on selecting a slim fry function the oven executes a heat-up phase in which starting from room temperature the oven cavity is heated to a temperature that corresponds to a set temperature plus a first hysteresis.

Both the set temperature and the first hysteresis preferably are set automatically by the device control upon the user initiating a slim fry operation such as by selecting a "slim fry" option from a list of available cooking programs, which function preferably is further specified by the user selecting from a list, such as a scroll down menu, the particular food item he or she wishes to process. Based on the user selection, the program control selects appropriate program parameters, such as the set temperature, the values of the first, second and third hysteresis, the durations of the individual program phases, the power levels of the ring heating element and optionally of the bottom heating element, a switching cycle of the bottom heating element, etc.

FIG. 1 illustrates an exemplary diagram for a cooking oven having a 1 kW bottom heating element and a 2.3 kW ring element, which in the exemplary embodiment shown both are operated in an on-off mode, i.e. are either operated at their full power level or are switched off.

FIG. 1 illustrates an embodiment in which a set temperature of 200° C. is employed. With the initial heat-up phase employing a first hysteresis of 10% of the set temperature, in the heat-up phase the oven cavity thus is heated to a temperature of 220° C. by continuous operation of the 2.3 kW ring element and by simultaneously operating the 1.0 kW bottom heating element in an intermittent manner. To this end, in the example shown the bottom heating element repeatedly is switched on and off at a certain fixed cycle, which in the example shown comprises a 48 s cycle of on and off phases of equal length.

Upon reaching a temperature of 220° C. the heat-up phase is terminated, and the cooking oven is switched into a holding phase in which the bottom heating element and the ring heating element both are non-operative.

Given that the diagram shows the overall power consumption of the oven, which thus includes, in addition to the hearing elements, also the fan, the interior lighting and the device control, during the holding phase the power curve does not drop to zero but to a minor value that is indicative for the power consumption of such further device components.

With no heat being provided to the oven cavity during the holding phase, the temperature gradually decreases until a temperature in the oven cavity is reached which corresponds to the set temperature of 200° C. minus a second hysteresis, which in the illustrated embodiment has been set to a value of 5% of the set temperature. Hence, upon the temperature in the oven cavity having dropped from 200° C. to 190° C. during the holding phase, the oven control initiates the frying phase. In the illustrated embodiment both the bottom heating element and the ring heating element are intermittently operated, i.e. are simultaneously switched on and off at a cycle similar to the cycle of the bottom heating element during the heat-up phase. During the frying phase, the temperature within the oven cavity thus is increased in steps until reaching a temperature in the oven cavity which corresponds to the set temperature plus a predetermined third hysteresis. FIG. 1 illustrates an example in which such third hysteresis has a value of 5% of the set temperature. Hence, upon reaching a temperature within the oven cavity of 210° C., the frying phase is terminated.

While in the diagram illustrated in FIG. 1 the frying process is terminated at this stage, the oven door still is keep closed for a certain duration (here about 3 minutes), thus providing for an additional holding phase, until when the door is opened and thus the temperature within the oven cavity rapidly drops.

In case that larger food items were to be processed, such as breaded fish, or larger stuffed rolls, there could be provided a subsequent additional heating phase, in which the bottom heating element is switched off, and heat is provided into the oven cavity by means of the ring heating element. Preferably, such additional heating is carried out at a temperature that is lower substantially lower than the set temperature, such as a temperature that 40 K lower than the set temperature, which can be implemented either by continuously operating the ring heating element at a lower power level, by intermittently operating the ring heating element in a corresponding cycle, or by a combination of both measures.

Figure 2:
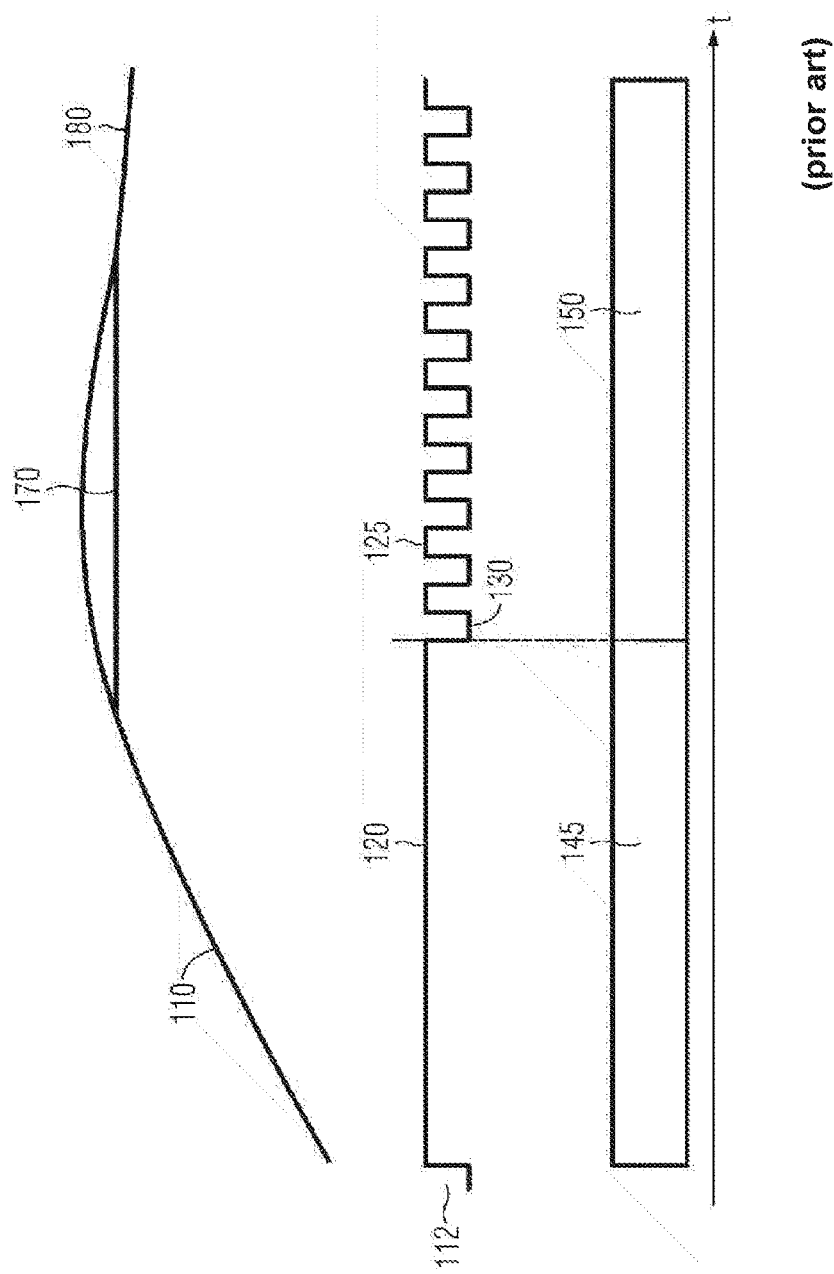
FIG. 2 illustrates a conventional control method.

FIG. 2 shows a conventional heating method for a radiant heating source such as a heater of a glass ceramic kitchen hob or an oven heater, which method is described in further detail in EP 2 887 763 A1. FIG. 2 illustrates a conventional operation in which in a first stage 145 upon turning on the respective heating zone, the heater is operated at a maximum or high power level so as to provide for a fast heating of the heated zone, and wherein after reaching a certain temperature level, the power level is reduced to a lower level.

To this end, as depicted in FIG. 2, during the first stage 145 the heater is operated at full load so that the pulse-width modulated power curve 112 of the heater shows a continuous maximum 120. During first stage 145 the temperature of the heated zone increases with a maximum gradient 110 which depends on the heat inertia of the heat source. Upon reaching a set temperature assigned to the power level selected by the user, the power source is operated during a second stage 150 at a lower power level, in which to provide less heat to the heated zone the heater is intermittently operated. During such lower power stage, the pulse width modulated power signal thus shows peaks 125 at the full power level and valleys 130 at a zero power level.

As further shown in FIG. 2, when switching from a high power level to a lower power level, upon reaching a set temperature 170 the temperature curve may raise beyond the set temperature due to heat inertia, until after a certain transient period a final temperature 180 is achieved which corresponds to the power level selected for second stage 150.

As suggested in EP 2 887 763 A1, an overshoot in temperature when switching from a higher to a lower power level can be alleviated by reducing the ratio of the on/off operation at the beginning of the second stage so that pulse-width modulated power curve 112 shows shorter peaks and longer valleys until the desired temperature level 180 is reached.

The invention claimed is:

1. A control method for operating a cooking oven in an air-frying program which is configured for a predetermined set temperature, the cooking oven having an oven cavity, a tray arranged within the oven cavity, a bottom heating element for heating a bottom of the cavity, a fan located at a rear wall of the cavity, and a ring heating element surrounding the fan, the method comprising the following stages:
    (a) a heat-up phase in which the ring heating element is continuously operated and the bottom heating element is intermittently operated, the heat-up phase being conducted until reaching a temperature of the oven cavity which corresponds to the set temperature plus a predetermined first hysteresis, wherein a food item is placed in the oven cavity during or before the heat-up phase to crisp an exterior of the food item;
    (b) a subsequent holding phase in which the bottom heating element and the ring heating element are non-operative; and
    (c) a frying phase conducted upon reaching a temperature within the oven cavity which corresponds to the set temperature minus a predetermined second hysteresis, the frying phase comprising continuously or intermittently operating the ring heating element, and intermittently operating the bottom heating element so as to raise the temperature within the oven cavity to a temperature which corresponds to the set temperature plus a predetermined third hysteresis, wherein termination of the frying phase is dependent on a degree of browning of the food item inside the oven cavity;
    the method further comprising operating the fan during at least one of the stages.

2. The method of claim 1, wherein the fan is operated during all stages.

3. The method of claim 1, wherein intermittent operation of said ring heating element and said bottom heating element during the heat-up phase and/or during the frying phase comprises intermittently operating the respective heating element so as to be operated during 50% to 70% of the respective phase.

4. The method of claim 3, wherein the intermittent operation comprises periodically switching the ring heating element or the bottom heating element between a first and a second power level, or periodically switching the ring heating element or the bottom heating element on and off.

5. The method of claim 1, wherein the predetermined first hysteresis corresponds to 5% to 15%.

6. The method of claim 1, wherein the set temperature is in the range of 180° C. to 220° C.

7. The method of claim 1, wherein during the heat-up phase the ring heating element is operated at a power intake that corresponds to 180% to 250% of a power intake of the bottom heating element.

8. The method of claim 1, wherein the predetermined second hysteresis is in the range of 5 to 20 K.

9. The method of claim 1, wherein the predetermined third hysteresis is in the range of 5 to 20 K.

10. The method of claim 1, wherein during the frying phase the ring heating element and the bottom heating element both are operated at maximum power intake.

11. The method of claim 1, wherein the ring heating element is configured to operate at a constant power.

12. The method of claim 1, further comprising an additional step following the frying phase in which only the ring heating element is operated while the bottom heating element is turned off.

13. The method of claim 12, in which in the additional step the temperature of the oven cavity is lowered to a temperature in the range of from 120° C. to 170° C.

14. The method of claim 1, wherein the tray has a discontinuous surface for the placement of the food item.

15. The method of claim 14, in which the discontinuous surface for the placement of the food item has a plurality of apertures which comprise at least 45% of surface.

\* \* \* \* \*